US012799980B2

(12) United States Patent
Bauer et al.

(10) Patent No.: US 12,799,980 B2
(45) Date of Patent: Nov. 17, 2026

(54) INNER RING ASSEMBLY WITH LOCKING COLLAR RETENTION

(71) Applicant: AKTIEBOLAGET SKF, Gothenburg (SE)

(72) Inventors: Andrew Michael Bauer, Salem, WI (US); Jordan Eric Gutowski, Vernon Hills, IL (US); Rudolf Hauleitner, Ann Arbor, MI (US); Joseph Anthony D'Andrea, Oak Creek, WI (US); Alf Bachhausen, Woodstock, IL (US); Trenton Alan Midyett, Waukegan, IL (US); Marc Paul Yesowitz, Ann Arbor, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 19/038,783

(22) Filed: Jan. 28, 2025

(65) Prior Publication Data

US 2026/0218755 A1 Jul. 30, 2026

(51) Int. Cl.

*F16C 35/063* (2006.01)
*F16C 19/06* (2006.01)
*F16C 33/58* (2006.01)

(52) U.S. Cl.

CPC .......... *F16C 35/063* (2013.01); *F16C 33/586* (2013.01); *F16C 19/06* (2013.01)

(58) Field of Classification Search

CPC ...... F16C 19/06; F16C 33/586; F16C 35/063; F16C 35/07; F16C 35/073; F16D 1/0864

See application file for complete search history.

(56) References Cited

U.S. PATENT DOCUMENTS

| | | | | |
|---|---|---|---|---|
| 4,537,519 | A | 8/1985 | LaRou et al. | |
| 4,728,202 | A | 3/1988 | LaRou | |
| 5,417,500 | A | 5/1995 | Martinie | |
| 5,863,137 | A | 1/1999 | Johnson et al. | |
| 6,336,748 | B2 | 1/2002 | Johnson et al. | |
| 6,840,679 | B2 | 1/2005 | Lenick et al. | |
| RE39,027 | E | 3/2006 | Johnson et al. | |
| 7,300,210 | B2 | 11/2007 | Johnson et al. | |
| 7,306,375 | B2 | 12/2007 | Lenick et al. | |
| 9,618,042 | B2 | 4/2017 | Kamath et al. | |
| 11,536,318 | B1 * | 12/2022 | Bauer .................. | F16C 35/063 |

(Continued)

*Primary Examiner* — Alan B Waits

(74) *Attorney, Agent, or Firm* — J-TEK LAW PLLC; Scott T. Wakeman; Mark A. Ussai

(57) ABSTRACT

A bearing inner ring assembly includes a bearing body disposable about a shaft, opposing axial ends, inner and outer surfaces and an annular groove in the outer surface providing a bearing race. A plurality of slotted openings extend inwardly from a first axial end of the bearing body, are spaced circumferentially about a centerline and define deflectable arcuate mounting tabs. Each mounting tab has an outwardly extending projection located to define a recess between the projection and an inner end of the tab, the recesses of all of the tabs defining an annular groove. An annular locking collar is disposable about the mounting tabs to clamp the tabs against the shaft. The collar has opposing axial ends, a central bore and a retainer shoulder extending radially inwardly from the central bore, the retainer shoulder being disposable within the groove of the bearing body to prevent relative axial displacement.

8 Claims, 14 Drawing Sheets

(56) References Cited

U.S. PATENT DOCUMENTS

| | | | | |
|---|---|---|---|---|
| 2001/0010738 | A1 * | 8/2001 | Johnson | F16D 1/0864 384/537 |
| 2021/0115976 | A1 * | 4/2021 | Haller | F16D 1/0847 |

* cited by examiner

INNER RING ASSEMBLY WITH LOCKING COLLAR RETENTION

BACKGROUND OF THE INVENTION

The present invention relates to bearings, and more particularly to bearing inner rings for rolling element bearings.

Rolling element bearings basically include an inner ring mounted on a shaft or inner member, an outer ring disposed within a housing or outer member, and a plurality of rolling elements disposed between and rotatably coupling the inner and outer rings. In general, the inner ring is mounted on the shaft by an interference or press fit, which requires relatively precise machining of the shaft outer surface for proper installation. However, in applications where it is desired to avoid such shaft machining, for example to reduce costs, the inner ring may be installed on the shaft by an integral mounting means, i.e., a mounting mechanism provided with the bearing.

Typically, such integral mounting means include mounting fingers or tabs formed on the bearing inner ring and a collar for clamping the fingers/tabs onto the shaft outer surface. For example, U.S. Pat. No. 11,536,318, the entire contents of which are incorporated by reference herein, which is owned by Aktiebolaget SKF and Peer Bearing Company, discloses an example of an inner ring assembly that includes an annular bearing body and a locking collar for securing the inner ring to a shaft.

SUMMARY OF THE INVENTION

In an aspect, the present invention is an inner ring assembly for a bearing, the bearing rotatably coupling a shaft with an outer member, the shaft being rotatable about a central axis. The inner ring assembly comprises an annular bearing body disposable about the shaft and having a centerline, opposing first and second axial ends, an inner circumferential surface, an outer circumferential surface, and an annular groove extending radially inwardly from the outer circumferential surface and providing a bearing inner race. A plurality of slotted openings extend axially inwardly from the first axial end of the bearing body and are spaced circumferentially about the centerline so as to define a plurality of deflectable arcuate mounting tabs. Each mounting tab has an inner end integral with a remainder of the bearing body, an opposing, free outer end, and an arcuate projection extending radially outwardly from a remainder of the mounting tab. Each projection is located adjacent to the outer end such that a recess is defined between the projection and the inner end, the recesses of the plurality of mounting tabs collectively defining an annular groove. Further, an annular locking collar is disposable about the plurality of mounting tabs and is configured to clamp the mounting tabs against the outer surface of the shaft so as to retain the inner ring radially and axially with respect to the shaft central axis. The collar has an inner axial end, an outer axial end, a central bore extending axially between the inner and outer ends, and a retainer shoulder extending radially inwardly from the central bore. The retainer shoulder is disposable within the groove of the bearing body so as to prevent axial displacement of the collar toward the first axial end of the bearing body, particularly when the inner ring assembly is separate from the shaft.

Preferably, the projection of each mounting tab has an axially-extending outer surface section and a chamfer surface section extending axially and radially outwardly from the outer end of each mounting tab to the outer surface section. Also, the central bore of the locking collar preferably has a chamfer surface section extending axially and radially inwardly from the inner axial end of the locking collar to the retainer shoulder. The collar chamfer surface section is engageable with all of the mounting tab chamfer surface sections such that displacement of the locking collar axially toward the second axial end of the bearing body deflects all of the mounting tabs radially inwardly until the retainer shoulder is disposed within the annular groove.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
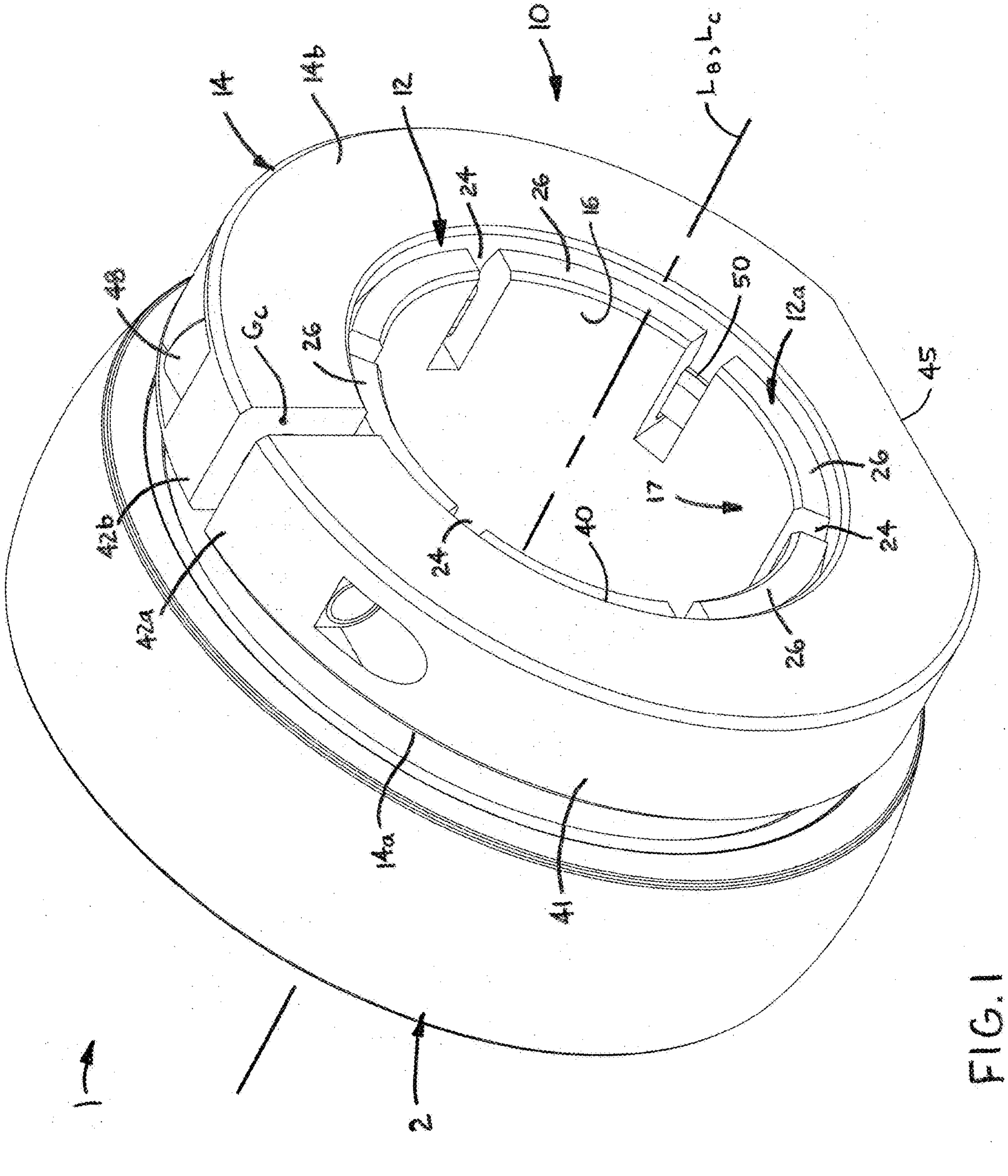
FIG. 1 is a perspective view of a bearing with an inner ring assembly in accordance with the present invention.
Figure 2:
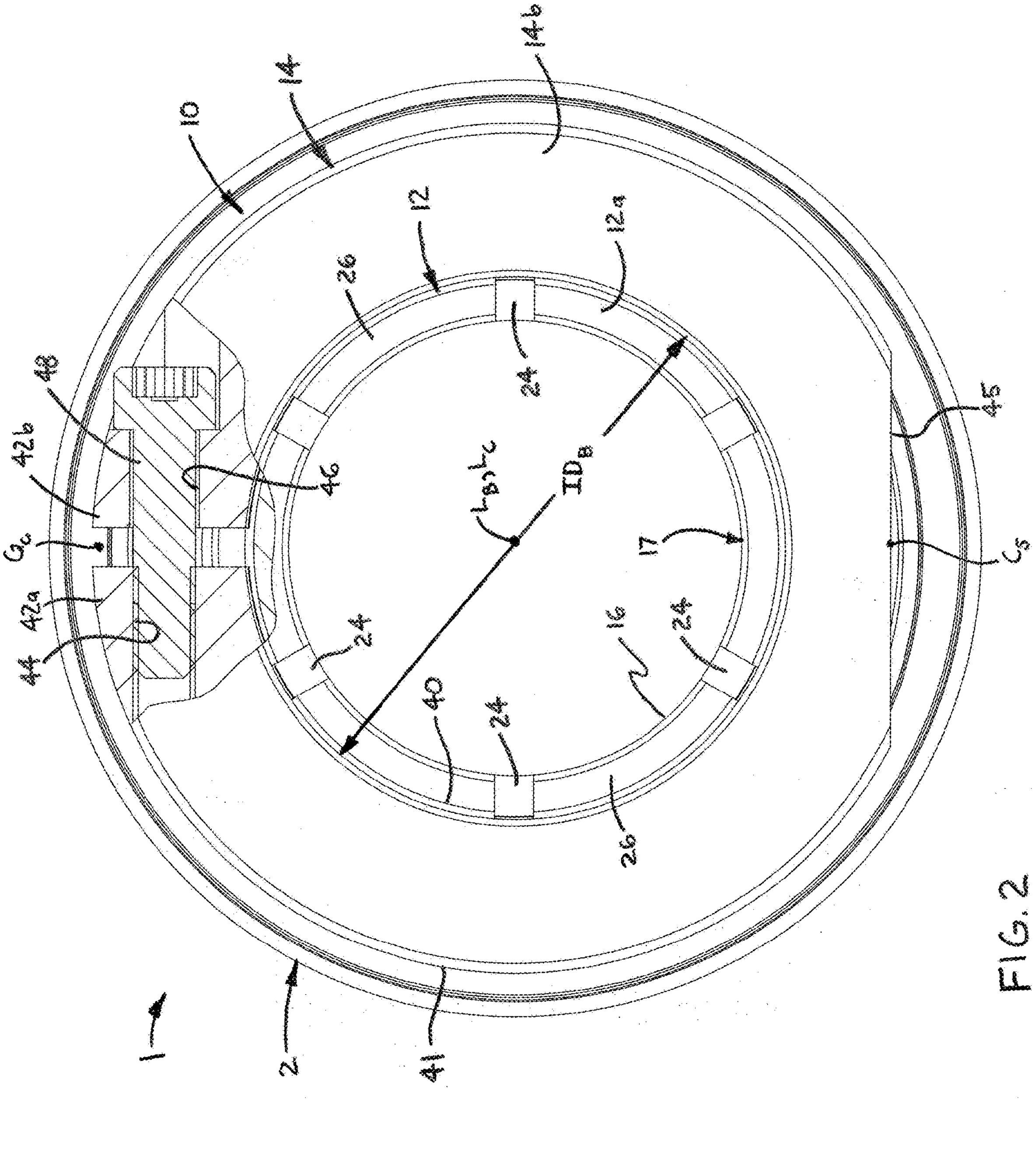
FIG. 2 is a front plan view of the bearing of FIG. 1.
Figure 3:
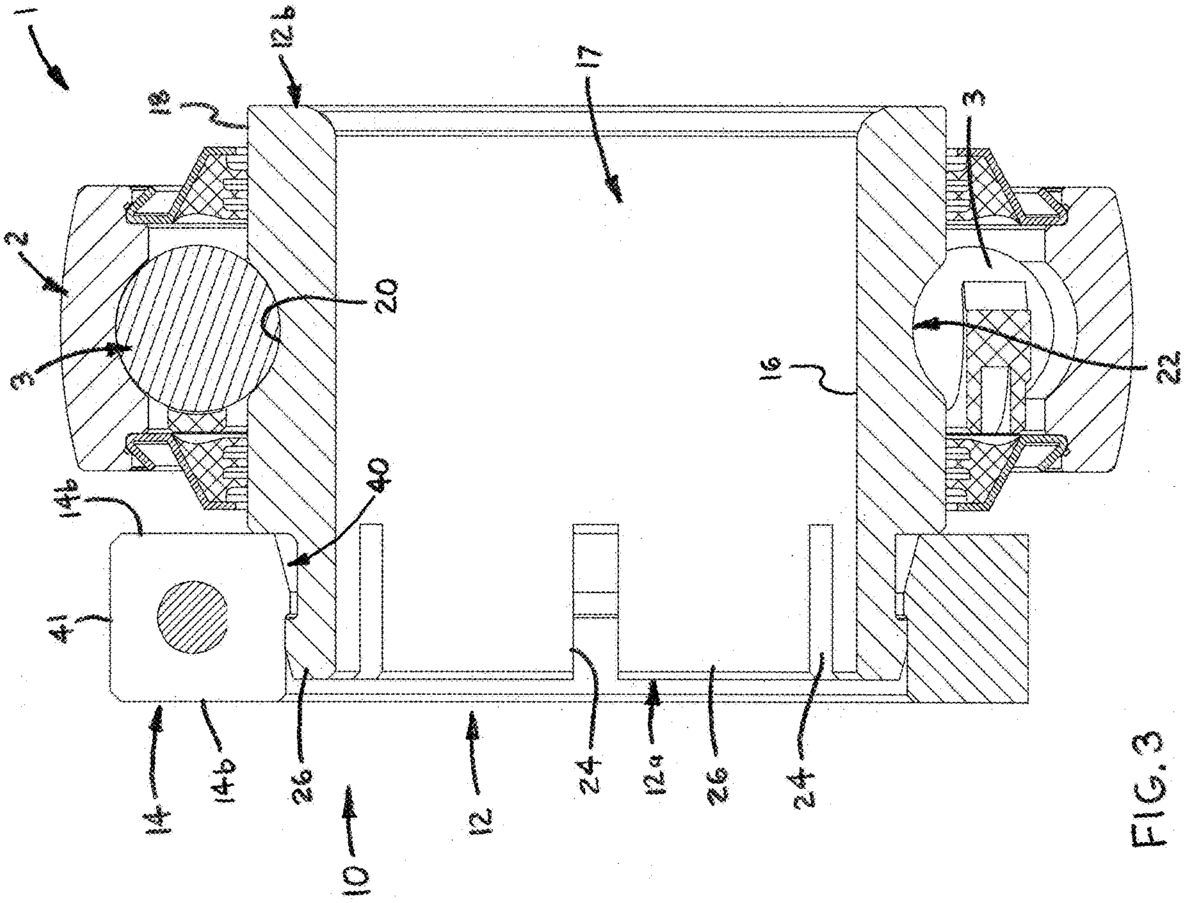
FIG. 3 is an axial cross-sectional view of the bearing of FIG. 1.
Figure 4:
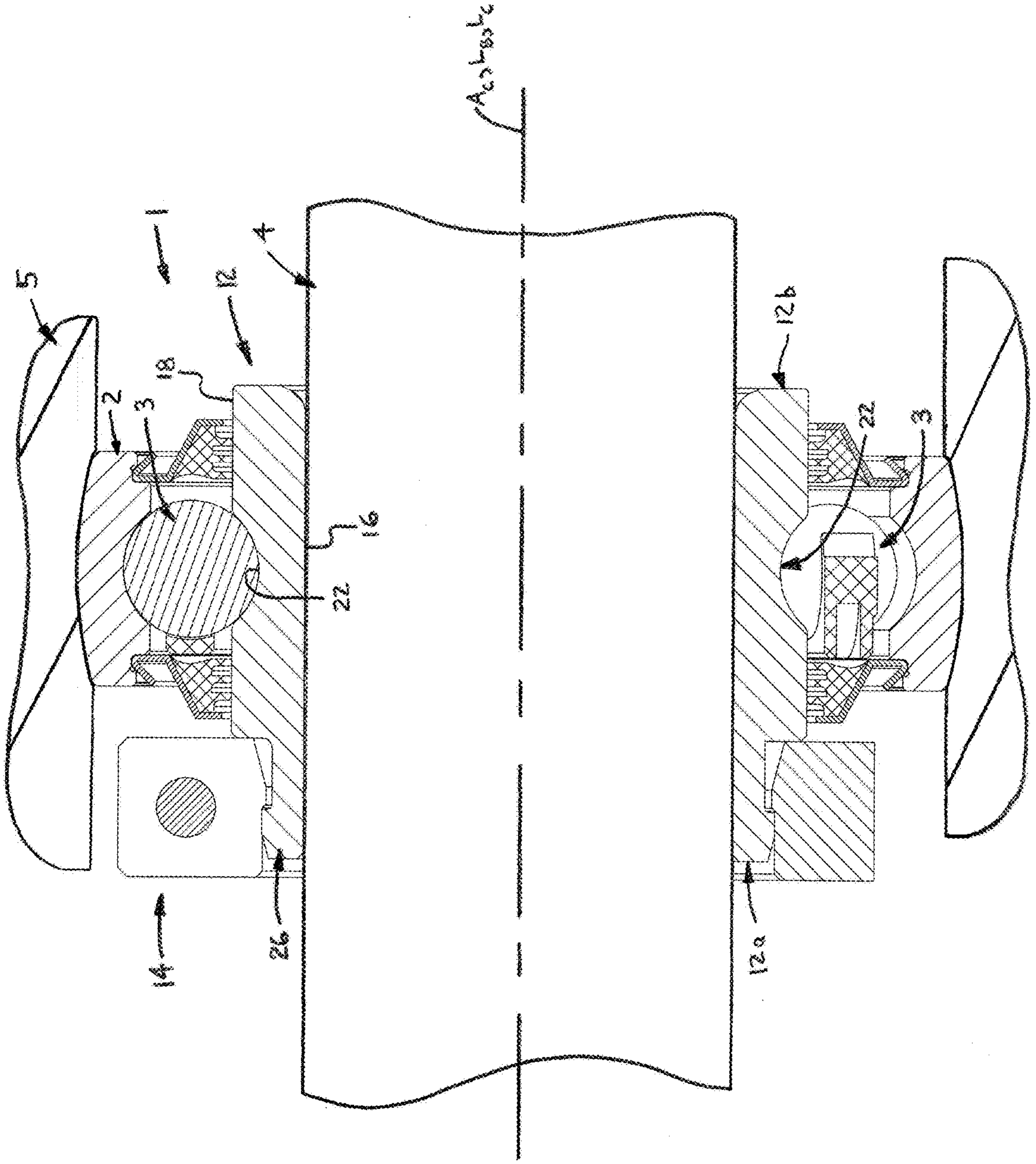
FIG. 4 is another axial cross-sectional view of the bearing, shown installed upon a shaft and within an outer member.
Figure 7:
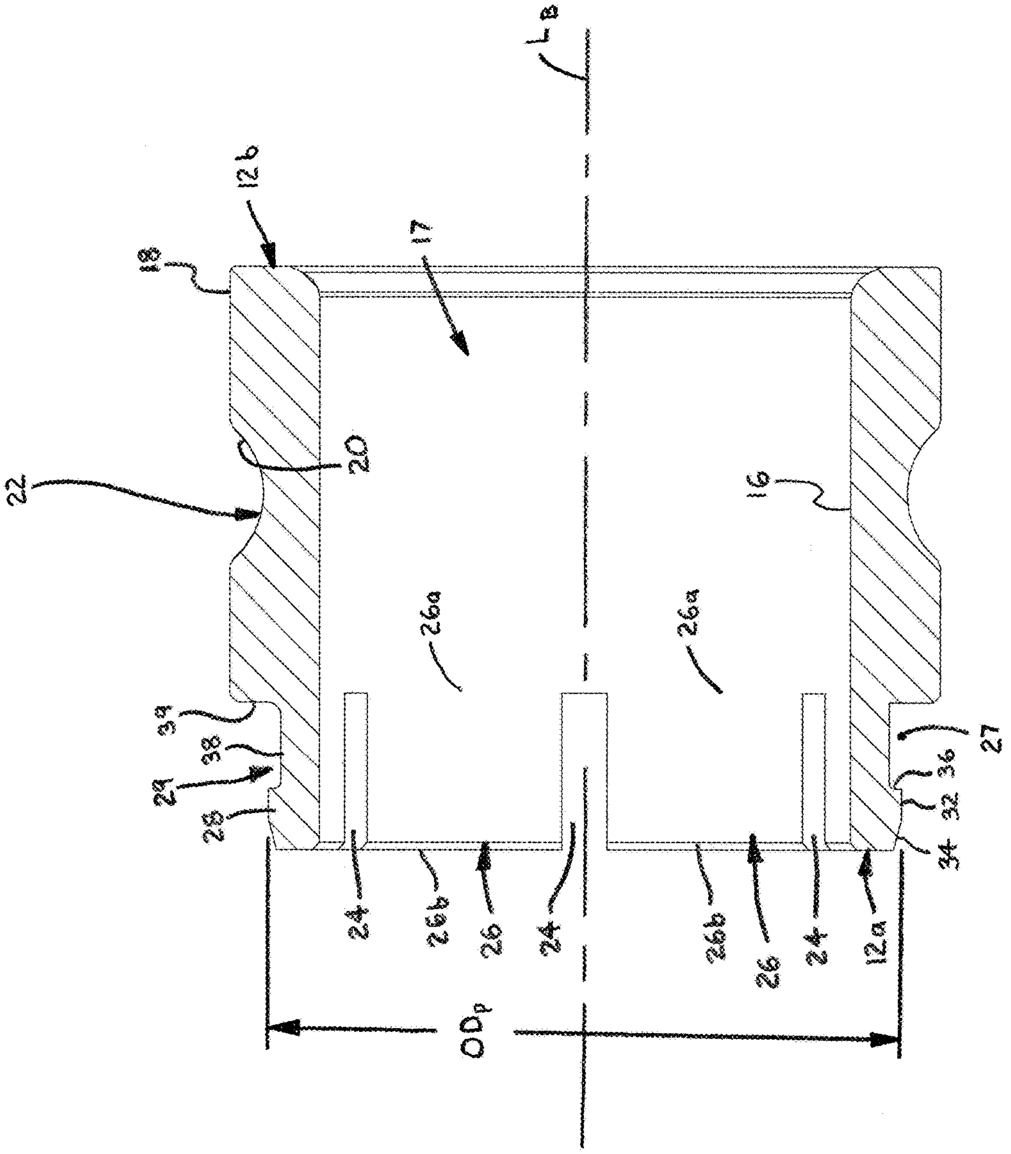
FIG. 7 is an axial cross-sectional view of the inner bearing body.

Referring now to the drawings in detail, wherein like numbers are used to indicate like elements throughout, there is shown in FIGS. 1-14 an inner ring assembly 10 for a bearing 1, the bearing 1 preferably including an outer ring 2 disposed about the inner ring assembly 10 and a plurality of rolling elements 3 disposed between the inner ring assembly 10 and the outer ring 2 as shown in FIGS. 3, 4 and 7. As depicted in FIG. 4, the bearing 1 rotatably couples a shaft 4 with an outer member 5, such as a housing, the shaft 4 being rotatable about a central axis $A_C$. The inner ring assembly 10 basically comprises an annular bearing body 12 disposable about the shaft 4, which provides an inner race 22, and an annular locking collar 14 disposable about a portion of the bearing body 12 and configured to retain the body 12 radially and axially on the shaft 4. With such an integral mounting structure, the bearing inner ring assembly 10 is readily mountable upon the shaft 4 without requiring precision machining of the shaft outer surface (not indicated). Also, the locking collar 14 is provided with a retainer shoulder 50 that couples the collar 14 with the bearing body 12 when the inner ring assembly 10 is separate from the shaft 4, as described in detail below.

Referring to FIGS. 1 and 3-7, the annular bearing body 12 has a centerline $L_B$, opposing first and second axial ends 12*a*, 12*b*, an inner circumferential surface 16 defining a central bore 17 for receiving the shaft 4 and an opposing outer circumferential surface 18. An annular groove 20 extends inwardly from the outer surface 18 and provides a bearing inner race 22 for receiving the rolling elements 3. A plurality of slotted openings 24 extend axially inwardly from the first axial end 12*a* of the annular body 12 and are spaced circumferentially about the centerline $L_B$ so as to define a plurality of radially deflectable arcuate mounting tabs 26. Each mounting tab 26 has an inner end 26*a* integral with a remainder of the annular body 12, an opposing, free outer end 26*b* at the body first axial end 12*a* and an arcuate projection 28 extending radially outwardly from a remainder of the mounting tab 26 and located adjacent to the tab outer end 26*b*. As such, a recess 27 is defined between the projection 28 and the inner end 26*a* of the mounting tab 26, the recesses 27 of the plurality of mounting tabs 26 collectively defining an annular groove 29.

Further, the projection 28 of each mounting tab 26 has an axially-extending outer surface section 32 and a chamfer surface section 34 extending axially and radially outwardly from the outer end 26*b* of the tab 26 to the outer surface section 32. The outer surface section 32 of each projection 28 has an outside diameter $OD_P$ (FIGS. 7 and 14) sized to enable the locking collar 14 to be secured on the bearing body 12, as discussed below. Furthermore, each projection 28 also has a stop surface section 36 extending radially inwardly from the outer surface section 32 and partially defining the recess 27 of the mounting tab 26.

Figure 5:
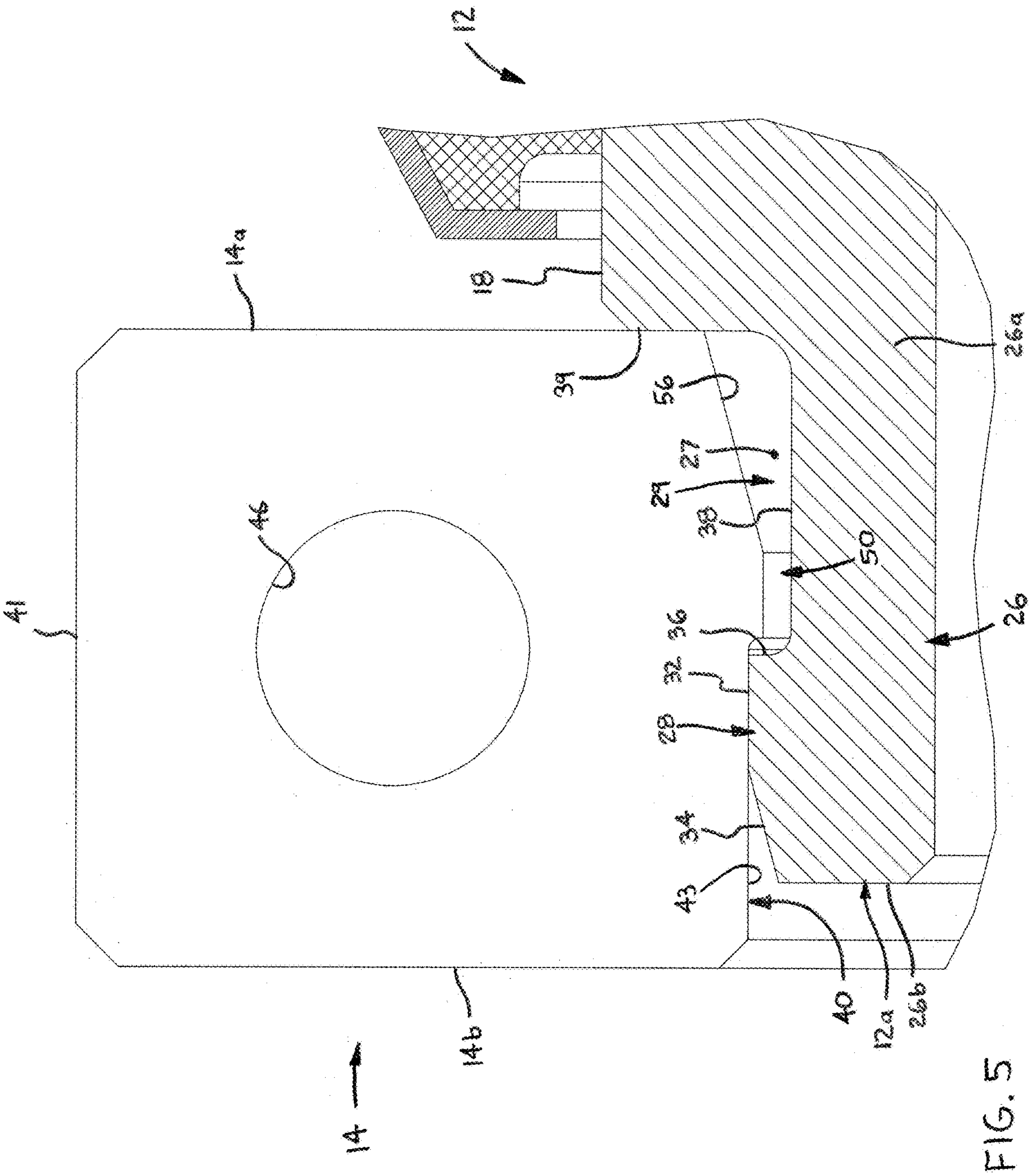
FIG. 5 is a broken-away, greatly enlarged view of a portion of FIG. 3, showing the engagement of a locking collar about a mounting tab of a bearing body.
Figure 6:
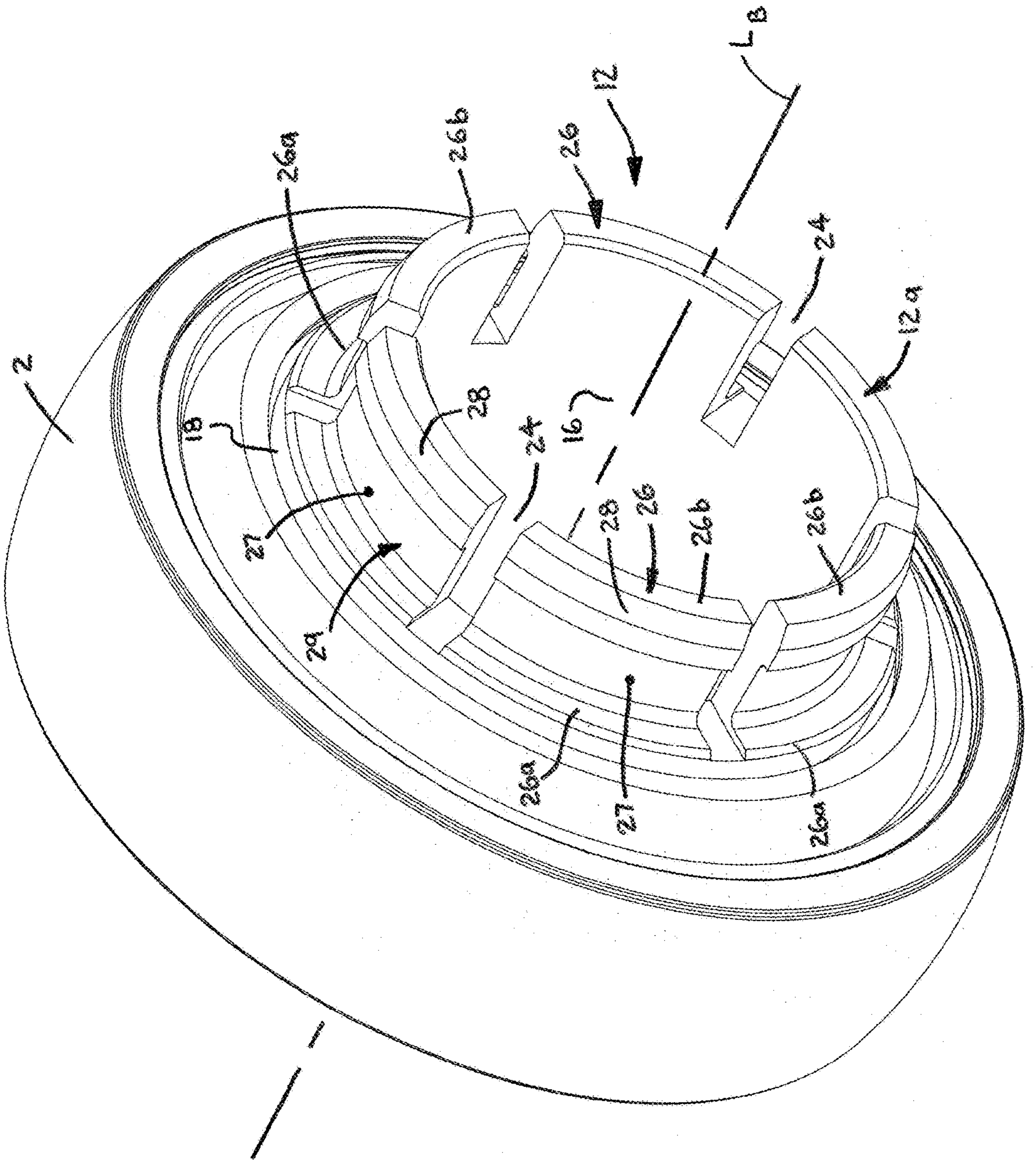
FIG. 6 is a perspective view of the bearing shown without the locking collar.

Referring to FIGS. 5 and 7, each one of the plurality of mounting tabs 26 further has a recessed outer surface section 38 extending axially from the inner end 26*b* of the mounting tab 26 to the projection 28 of the tab 26, specifically to the radial stop surface section 36. The recessed surface section 38 partially defines the recess 27 of the mounting tab 26 and is spaced radially inwardly from the main outer circumferential surface 18 of the remainder of the bearing body 12. As such, a stop surface 39 extends radially from the main outer surface 18 to the recessed outer surface section 38.

Referring now to FIGS. 1-5 and 7-14, the annular locking collar 14 is disposed about the plurality of mounting tabs 26 and is configured to clamp the tabs 26 against the outer surface 4*a* of the shaft 4, as depicted in FIG. 4. Such clamping of the mounting tabs 26 retains the bearing body 12 radially and axially with respect to the shaft central axis $A_C$. The locking collar 14 has a centerline $L_C$, inner and outer axial ends 14*a*, 14*b*, respectively, a central bore 40 and an outer circumferential surface 41. The central bore 40 extends axially between the inner and outer axial ends 14*a*, 14*b* and has a main inner surface section 43 with an inside diameter $ID_B$ (FIGS. 2 and 10). Further, the locking collar 14 has a gap $G_C$ defining spaced-apart first and second circumferential ends 42*a*, 42*b*, respectively. Specifically, the gap $G_C$ extends both axially between the first and second axial ends 14*a*, 14*b* and radially between the central bore 40 and the outer circumferential surface 41.

Furthermore, a threaded opening 44 is formed in the first circumferential end 42*a*, a through hole 46 is formed in the second circumferential end 42*b*, and the locking collar 14 further includes a threaded rod 48 extending through the through-hole 46 and into the threaded opening 44. As such, rotation of the rod 48 in a first angular direction (e.g., clockwise) displaces the collar first and second ends 42*a*, 42*b* generally toward each other to reduce the inside diameter $ID_B$ of the central bore 40 and thereby compress the plurality of mounting tabs 26 into engagement with the shaft 4. Alternatively, rotation of the rod 48 in a second, opposing angular direction (e.g., counter clockwise) displaces the collar ends 42*a*, 42*b* away from each other to increase the bore inside diameter $ID_B$ and thereby release the compression of the mounting tabs 26 from the shaft 4. Preferably, the threaded opening 44 in the first circumferential end 42*a* of the locking collar 14 is oriented such that torque applied to rotate the threaded rod 48 in the first angular direction biases the locking collar 14 axially toward the second axial end 12*b* of the bearing body 12.

Referring particularly to FIGS. 1, 2, 8 and 9, the locking collar 14 is preferably formed such that the outer circumferential surface 41 has a flat surface section 45, which reduces the total mass of the collar 14. The flat surface section 45 has a center $C_S$ spaced about one hundred eighty degrees from the collar gap $G_C$, as indicated in FIG. 2. The reduction in mass of the locking collar 14 and the location of the surface section 45 relative to the collar gap $G_C$ increases the dynamic balance of the locking collar 14 about the shaft central axis $A_C$. Also, the flat surface section 45 increases the flexibility of the locking collar 14 during compression of the plurality of mounting tabs 26.

Figure 14:
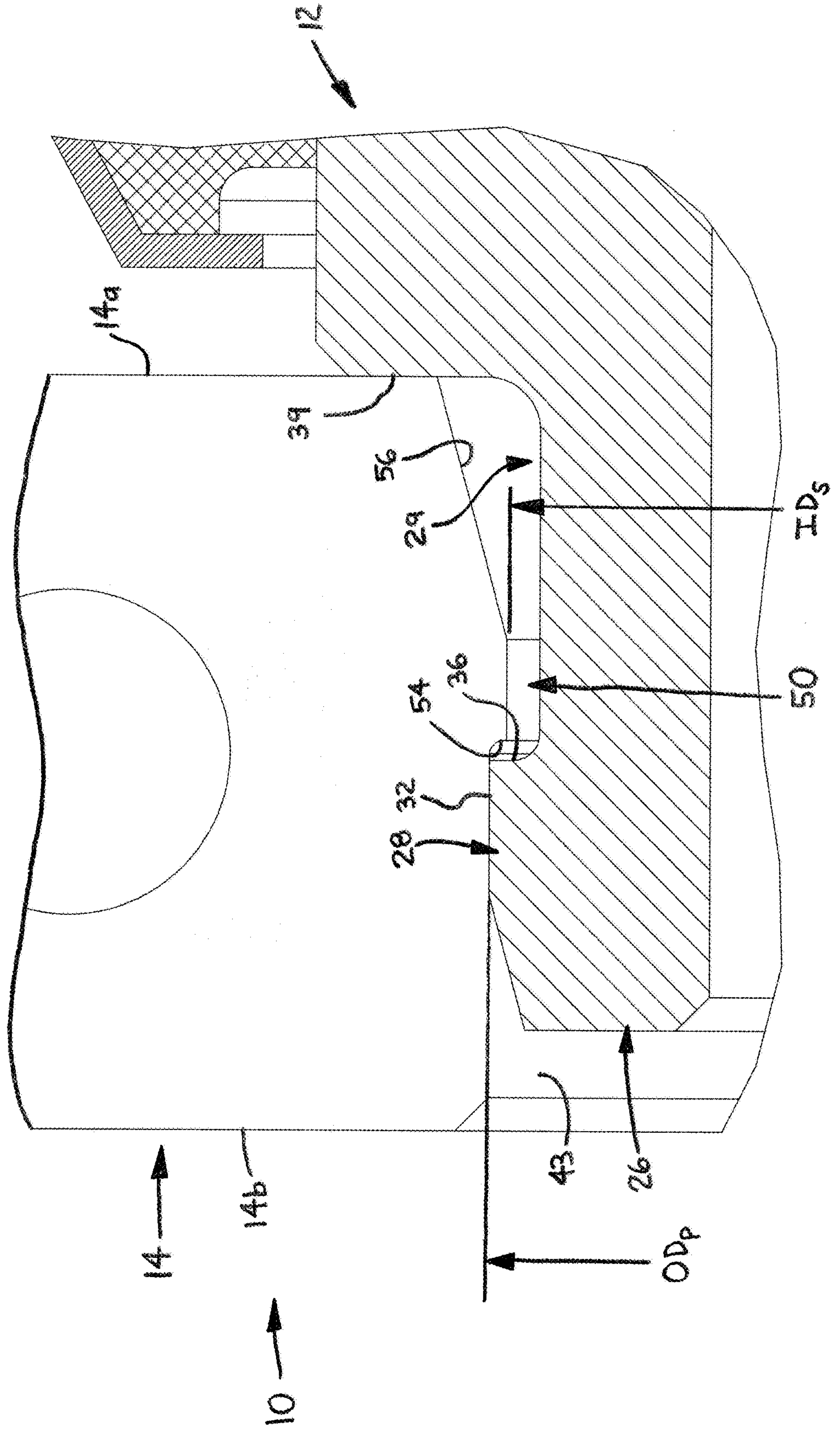
FIG. 14 is a broken-away, greatly enlarged view of the bearing showing the engagement of a locking collar about one mounting tab of the bearing body.

Referring now to FIGS. 5 and 8-11, the locking collar 14 further includes a retainer shoulder 50 extending radially inwardly from the central bore 40 and having an inner circumferential surface 52 with an inside diameter $ID_S$ (FIGS. 10 and 14). The main inner surface section 43 of the collar bore 40 extends from the collar first axial end 14*a* to the shoulder 50, such that the shoulder 50 further has a retention surface 54 extending radially between the main surface section 43 and the shoulder inner circumferential surface 52. Preferably, the central bore 40 of the locking collar 14 also has a chamfer surface section 56 extending axially and radially inwardly from the inner axial end 14*a* of the locking collar 14 to the retainer shoulder 50.

Figure 8:
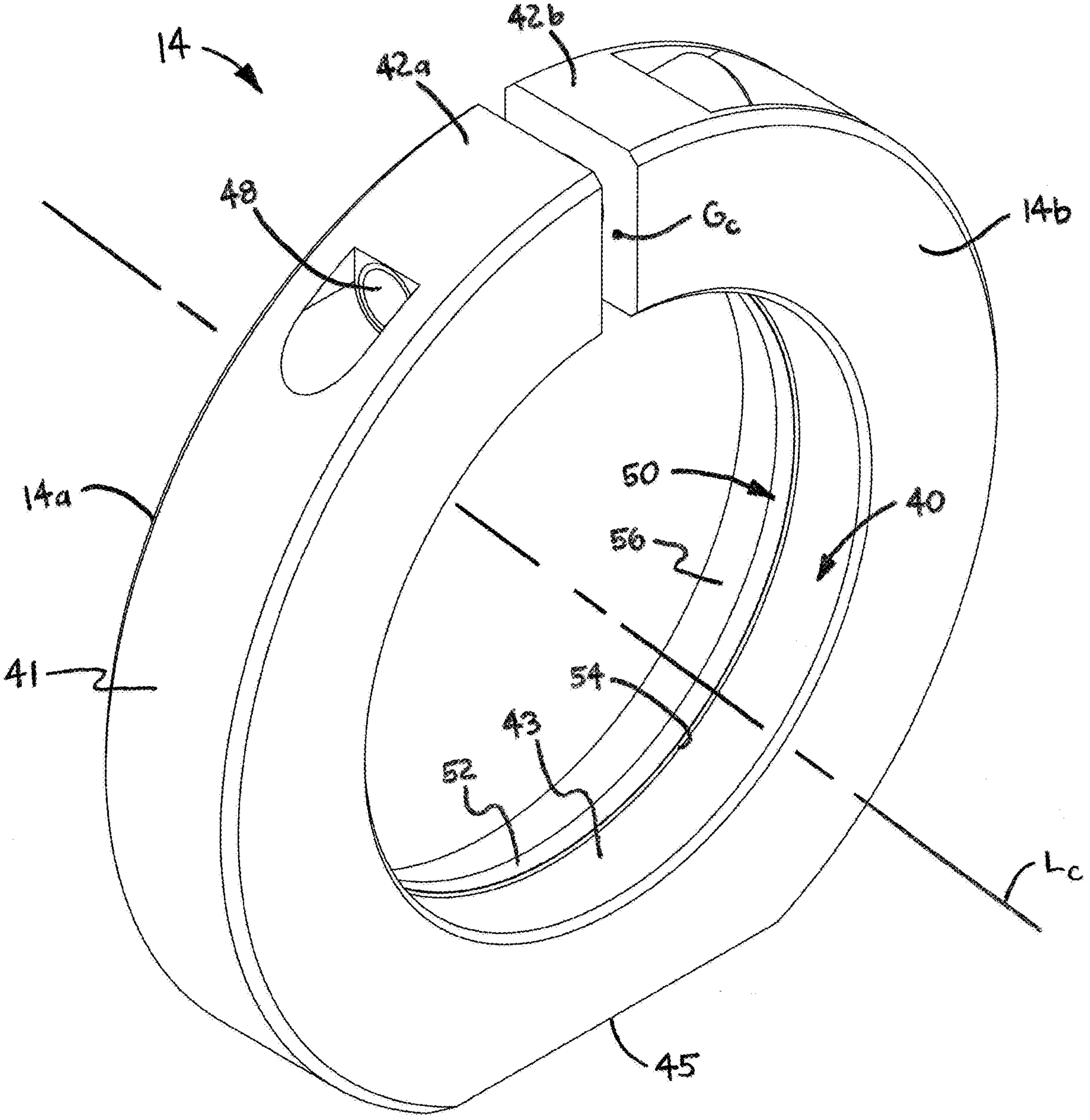
FIG. 8 is a front perspective view of the locking collar.
Figure 9:
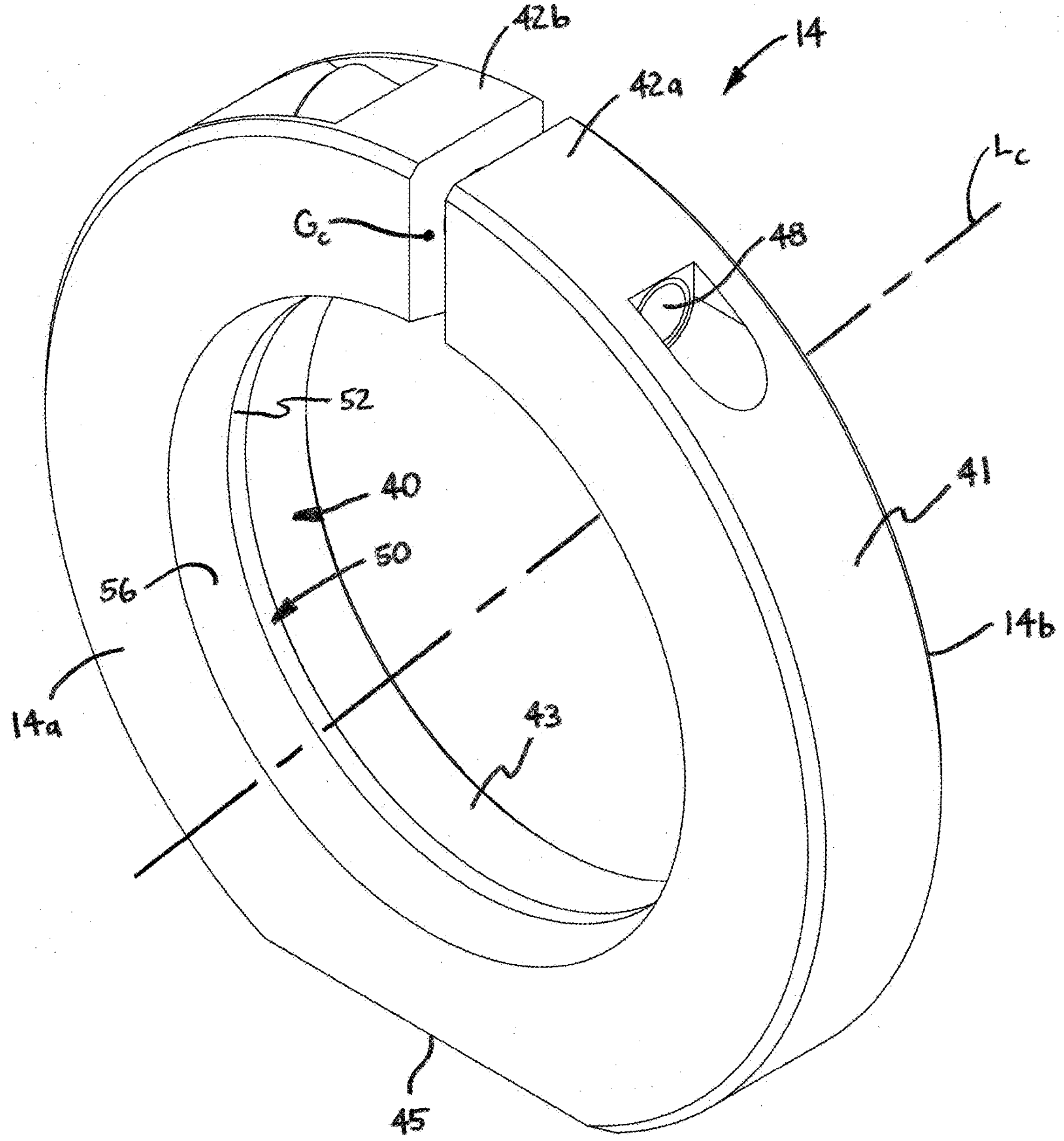
FIG. 9 is a rear perspective view of the locking collar.
Figure 10:
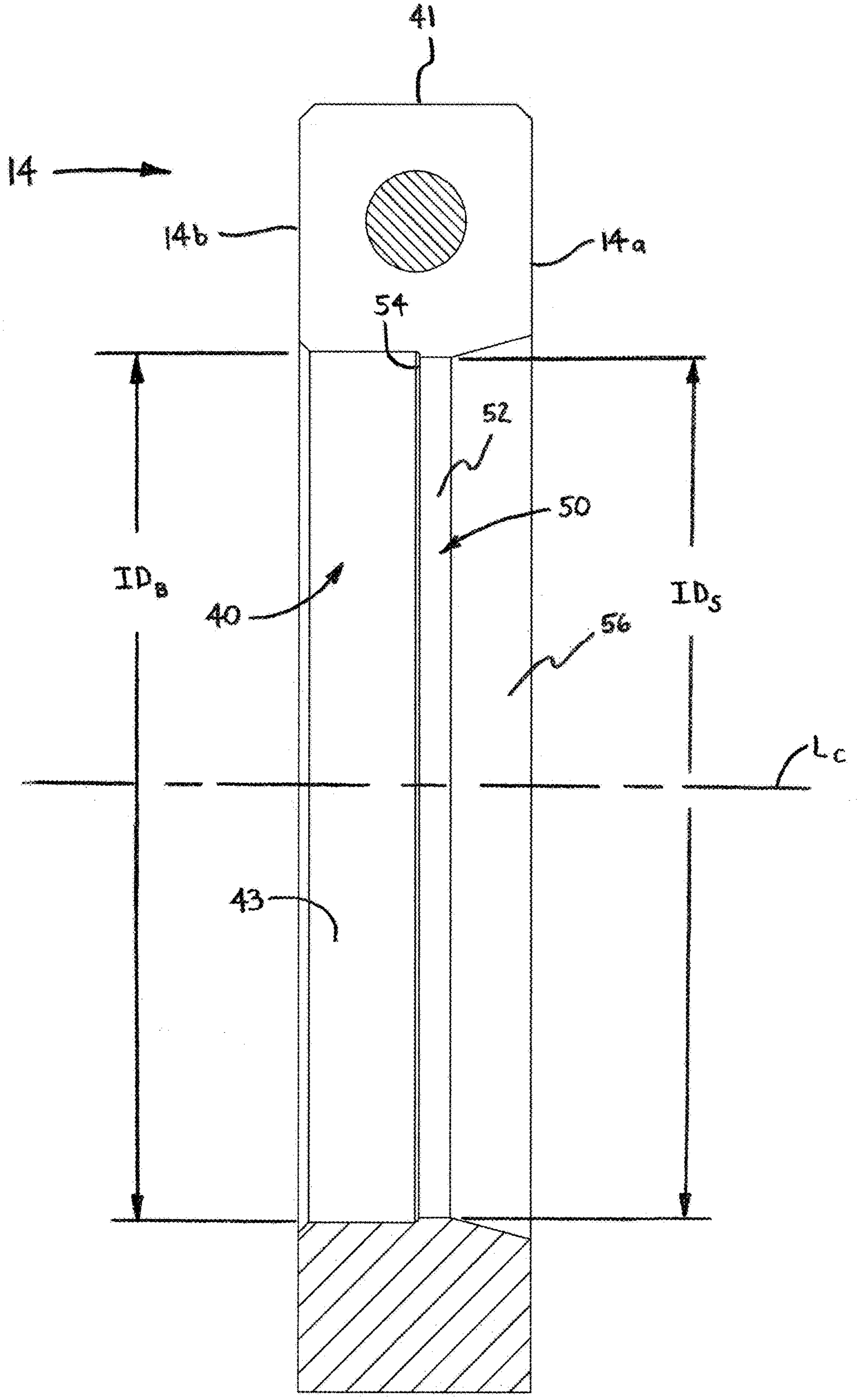
FIG. 10 is an axial cross-sectional view of the locking collar.
Figure 11:
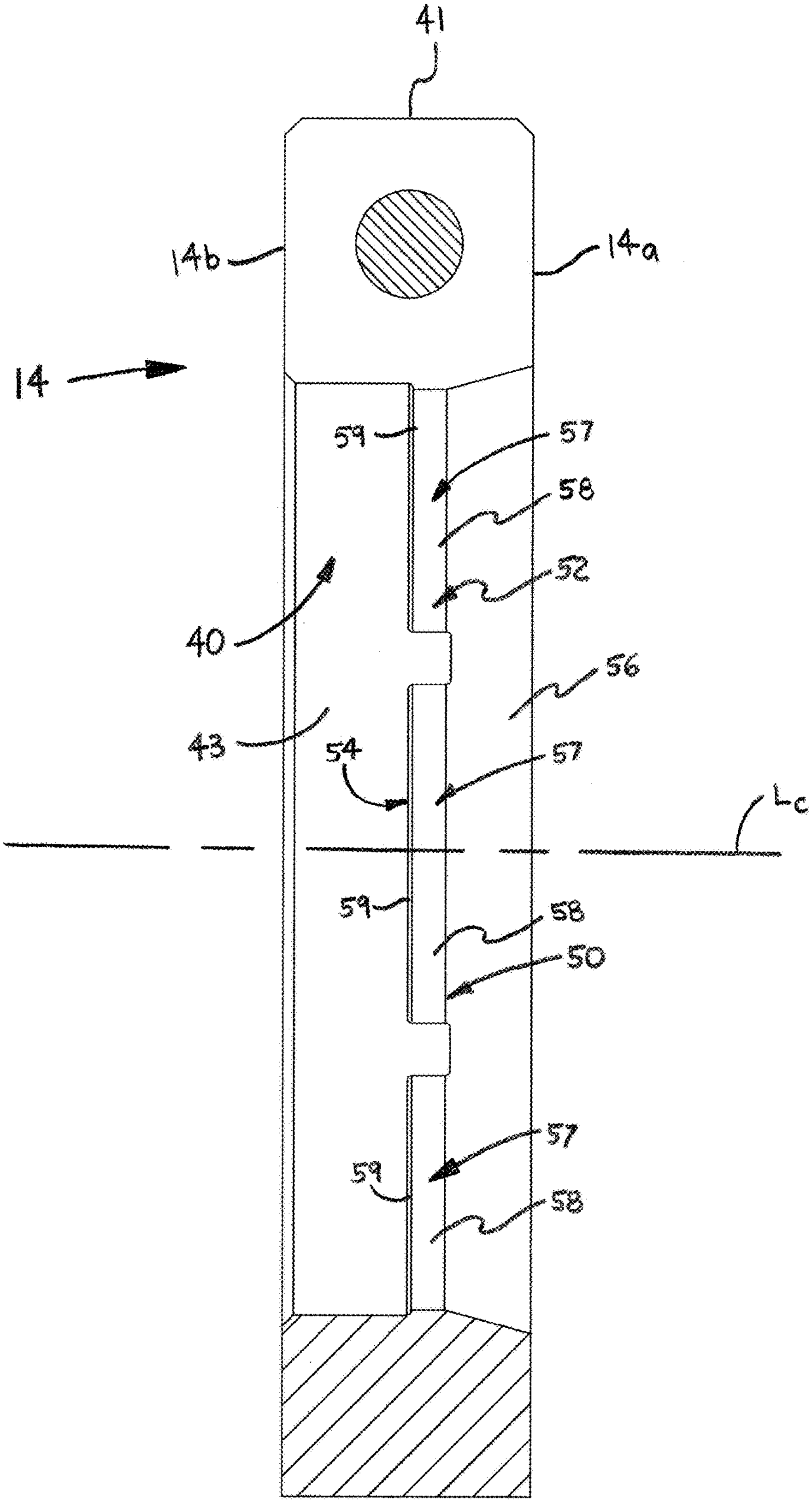
FIG. 11 is an axial cross-sectional view of the locking collar, showing an alternative structure of a retainer shoulder.

Preferably, the retainer shoulder 50 is integrally formed with the remainder of the locking collar 14 and is either annular and extends entirely around the collar centerline $L_C$, as shown in FIGS. 8-10, or is arcuate and extends partially about the centerline $L_C$, as depicted in FIG. 11. In the latter case, the retainer shoulder 50 may include a plurality of arcuate shoulder segments 57 spaced circumferentially about the centerline $L_C$ and each having an inner circumferential surface 58 and a radial surface 59 collectively defining the shoulder inner circumferential surface 52 and the shoulder retention surface 54, respectively.

Alternatively, the locking collar 14 may be formed with an annular groove (not shown) extending radially outwardly from the central bore 40 and the retainer shoulder 50 may include an annular body (not depicted) disposed partially within the annular groove so as to project radially inwardly from the groove. Such a separate annular body may be formed as an O-ring, a C-clip or in any other appropriate manner capable of functioning as described herein.

With any of the structures described above, the retainer shoulder 50 is disposable within the annular groove 29 of the bearing body 12 so as to prevent axial displacement of the locking collar 14 toward the first axial end 12*a* of the body 12. Specifically, the inside diameter $ID_S$ of the retainer shoulder 50 of the locking collar 14 has a value less than a value of the outside diameter $OD_P$ of each projection 28 of the mounting tabs 26, as best shown in FIG. 14. As such, when the locking collar 14 is installed about the bearing body 12, the inner circumferential surface 52 of the shoulder 50 is spaced radially inwardly from the outer surface sections 32 of the projections 28 and the shoulder retention surface 54 is axially engageable against the stop surfaces 36 of the projections 28.

Thus, the locking collar 14 may be installed about the bearing body 12 when the inner ring assembly 10 is separate from the shaft 4 and the retainer shoulder 50 prevents decoupling of the collar 14 from the bearing body 12. Preferably, the inside diameter $ID_B$ of the bore main inner surface section 43 has a value less than the outside diameter $OD_P$ of the outer surface section 34 of each projection 28. As such, the main inner surface section 43 of the collar bore 40 is frictionally engaged with the projection outer surface sections 32 to further ensure that the locking collar 14 is retained about the bearing body 12.

Figure 12:
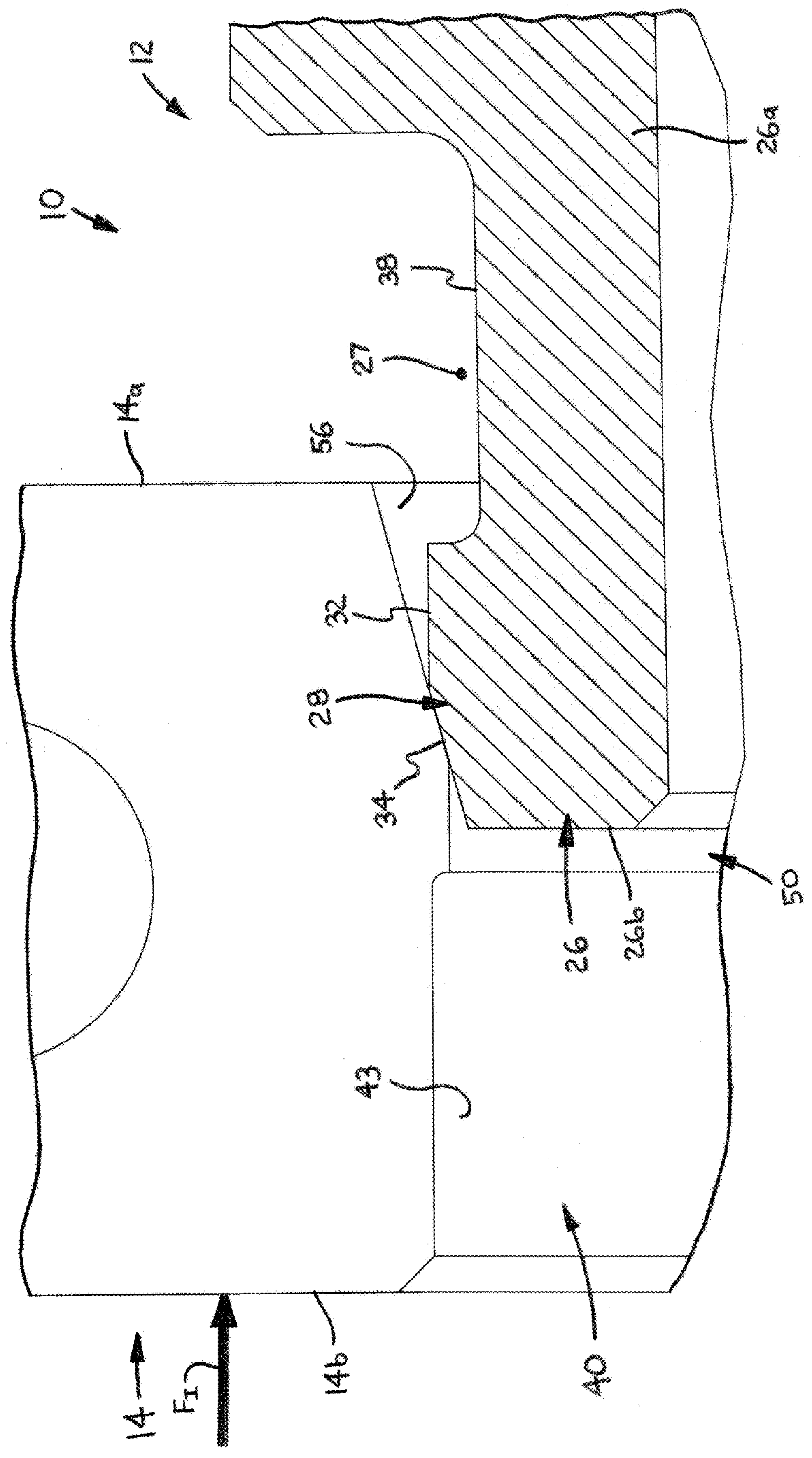
FIG. 12 is a broken-away, greatly enlarged axial cross-sectional view of the locking collar and one mounting tab during installation of the locking collar, showing the engagement of a locking collar chamfer surface with a projection chamfer surface of one mounting tab.
Figure 13:
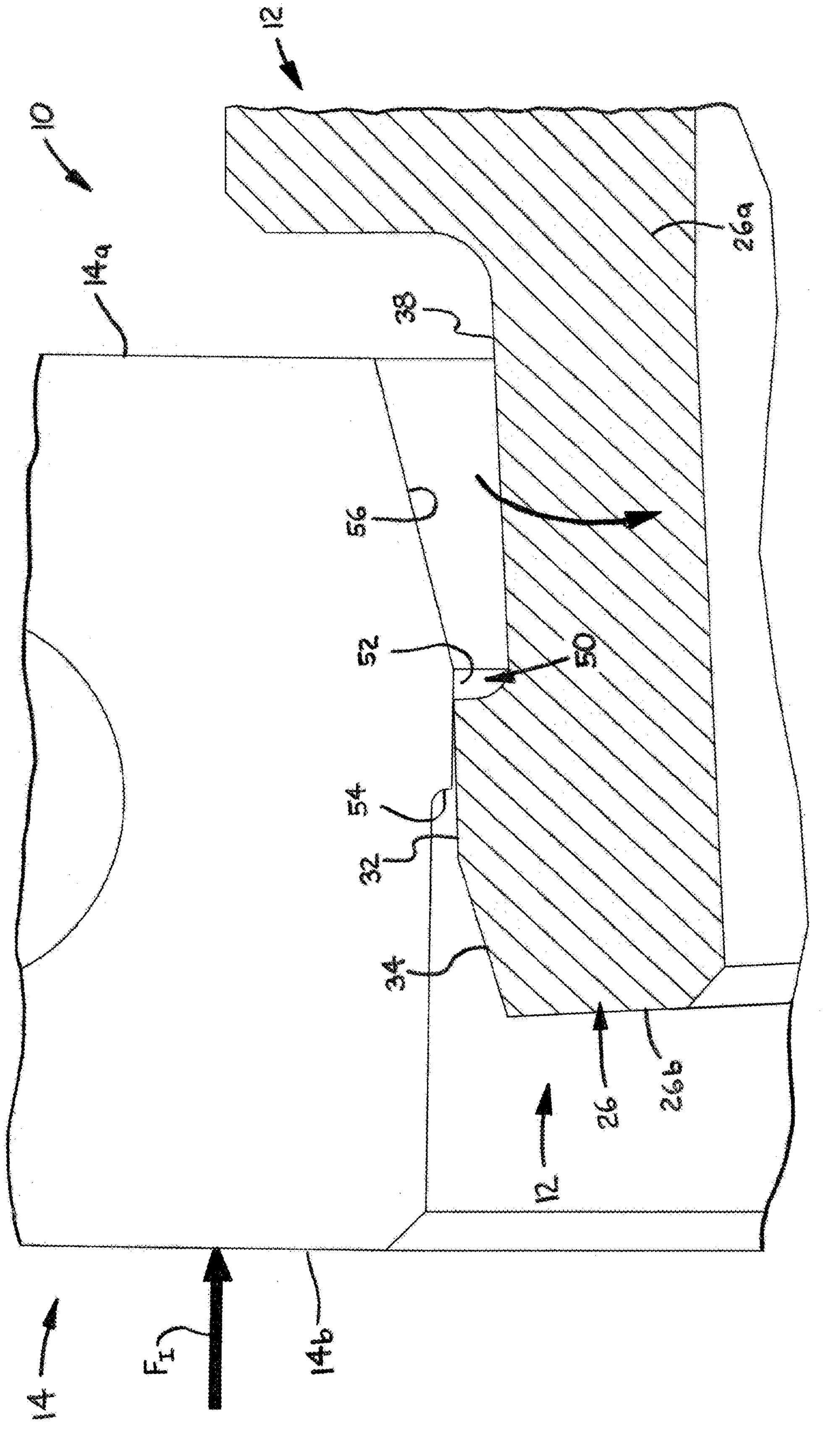
FIG. 13 is another view of the locking collar and mounting tab of FIG. 12, showing the radial deflection of the mounting tab when passing through the retainer shoulder of the locking collar.

Referring to FIGS. 12-14, due to the relative diametrical sizing of the mounting tab projections 28 of the bearing body 12 and the retainer shoulder 50 of the locking collar 14 as described above, the plurality of mounting tabs 26 of the bearing body 12 must be deflected radially inwardly in order to install the locking collar 14 about the bearing body 12. More specifically, the mounting tabs 26 must deflect inwardly so as to pass through the central bore 40 of the locking collar 14, particularly the retainer shoulder 50, when the collar 14 is pushed onto first axial end 12*a* of the bearing body 12. The collar 14 is then further displaced axially toward the second end 12*b* of the body 12 until the inner axial end 14*a* of the locking collar 14 is located axially adjacent to the inner ends 26*a* of the mounting tabs 26.

As indicated in FIGS. 12 and 13, an installation force $F_I$ is required to cause deflection of the mounting tabs 26 and such deflection of the tabs 26 is greatly facilitated by the engagement of the chamfer surface section 56 of the locking collar 14 with the chamfer surface sections 34 of the mounting tabs 26. Specifically, the chamfer surface section 56 of the locking collar 14 is engageable with all of the chamfer surface sections 34 of the mounting tabs 26 such that displacement of the locking collar 14 axially toward the second axial end 12*b* of the bearing body 12 deflects all of the mounting tabs 26 radially inwardly, as indicated by an arrow in FIG. 13, until the retainer shoulder 50 is disposed within the annular groove 29. That is, when the locking collar 14 is pushed onto the first axial end 12*a* of the bearing body 12 and is then displaced axially toward the second axial end 12*b* of the bearing body 12*b*, all of the mounting tabs 26 deflect radially inwardly due to a wedging action caused by the engagement of the chamfer surface sections 56, 34 until the inner chamfer surface section 56 of the locking collar 14 disengages from the outer chamfer sections 34 of the projections 28 of the mounting tabs 26. The inner circumferential surface 52 of the retainer shoulder 50 then slidably displaces against against the outer surface section 32 of each mounting tab projection 28 until the locking collar 14 displaces a sufficient axial distance such that the retainer shoulder 50 is disposed within the annular groove 29 of the bearing body 12.

At this point, the plurality of mounting tabs 26 disengage from the retainer shoulder 50 and are free to deflect radially outwardly so as to become disposed within the portion of the collar bore 40 defined by the main surface section 43. The locking collar 14 is thereby retained on the bearing body 12 by the interaction between the collar retainer shoulder 50 and the projections 28 of the plurality of mounting tabs 26; specifically, the shoulder 50 is engageable with the radial stop surfaces 36 of the projections 28 to prevent axial displacement of the collar 14 toward the first axial end 12*a* of the bearing body 12, as described above.

Preferably, a portion of the inner axial end 14*a* of the locking collar 14 is disposable against the stop surface 39 of the bearing body 12 to prevent axial displacement of the collar 14 relative to the body 12. Further, the locking collar 14 is preferably sized such that the axial distance (not indicated) between the retention surface 54 of the shoulder 50 and inner axial end 14*b* of the collar 14 is about equal to or slightly less than the axial distance (not indicated) between the stop surface sections 36 of the projections 28 and the body stop surface 39. As a result, the locking collar 14 is maintained axially aligned with the bearing body 12.

After installation of the locking collar 14 onto the bearing body 12 as discussed above, the inner ring assembly 10 may be stored and transported as an entire assembly rather than as two separate parts. As the inner ring assembly 10 typically has a substantial size and the bearing body 12 is formed of a rigid bearing steel (e.g., AISI grades 52100, 440C, M50, 8620, etc.), a relatively significant installation force $F_I$ is required to deflect the mounting tabs 26 radially inwardly to the extent necessary to "clear" the retainer shoulder 50. As such, it is preferred to use a hydraulic press to exert a sufficient axial force $F_I$ on the locking collar 14 to install the collar 14 on the bearing body 12 as described above. However, in certain applications in which the bearing body 12 is sized and/or formed of a material such that the mounting tabs 26 are relatively flexible, the locking collar 14 may be installed by manually pressing the locking collar 14 onto the first end 12*a* of the body 12 until the collar 14 is fully seated on the bearing body 12.

Further, when it is desired to install the inner ring assembly 10 on a shaft 4, preferably as an entire bearing 1 with an outer ring 2 and the rolling elements 3, the shaft 4 is merely inserted into the bore 17 of the bearing ring 12 until the inner ring assembly 10 is located at a desired position along the shaft axis $A_C$. Then, the threaded rod 48 of the locking collar 14 is rotated such that the circumferential ends 42*a*, 42*b* of the collar 14 displace toward each other so as to reduce the inside diameter $ID_B$ of the collar bore 40, such that the main inner surface section 43 of the bore 40 presses radially inwardly against the outer surface sections 32 of the projections 28 of the mounting tabs 26 so as to press the tabs 26 against the outer surface of the shaft 4.

Thereafter, the bearing inner ring assembly 10, and preferably the entire bearing 1, is ready for use once the outer ring 4 is coupled with an outer member 5, such as a housing, a hub, etc. When it is desired to uninstall the bearing inner ring assembly 10 from the shaft 4, the threaded rod 48 of the collar 14 is rotated in an opposing angular direction (e.g., counter clockwise) such that the circumferential ends 42*a*, 42*b* of the collar 14 displace away from each other and the inside diameter $ID_B$ of the bore 40 increases to the extent that the mounting tabs 26 are no longer compressed against the shaft 4. The inner ring assembly 10 may then be slidably displaced off the shaft 4.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. An inner ring assembly for a bearing, the bearing rotatably coupling a shaft with an outer member, the shaft being rotatable about a central axis, the inner ring assembly comprising:

an annular bearing body disposable about the shaft and having a centerline, opposing first and second axial ends, an inner circumferential surface, an outer circumferential surface, an annular groove extending radially inwardly from the outer circumferential surface and providing a bearing inner race, and a plurality of slotted openings extending axially inwardly from the first axial end and spaced circumferentially about the centerline so as to define a plurality of deflectable arcuate mounting tabs, each mounting tab having an inner axial end integral with a remainder of the bearing body, an opposing, free outer axial end, and an arcuate projection extending radially outwardly from a remainder of the mounting tab and located adjacent to the outer end such that a recess is defined between the projection and the inner end, the recesses of the plurality of mounting tabs collectively defining an annular groove, the projection of each mounting tab having an axially-extending radially-outermost surface section, a chamfer surface section extending axially and radially outwardly from the outer axial end of each mounting tab directly to the radially-outermost surface section, and a radial stop surface section extending radially inwardly from the radially-outermost surface section and partially defining the recess; and an annular locking collar disposable about the plurality of mounting tabs and configured to clamp the mounting tabs against the outer surface of the shaft so as to retain the inner ring radially and axially with respect to the shaft central axis, the collar having an inner axial end, an outer axial end, a central bore extending axially between the inner and outer ends, and a retainer shoulder extending radially inwardly from the central bore, a retention surface extending radially between the central bore and the retainer shoulder, and a chamfer surface section extending axially and radially inwardly from the inner axial end to the retainer shoulder, the retainer shoulder having a cylindrical inner circumferential surface extending axially between the retention surface and the chamfer surface section and being disposable within the groove of the bearing body so as to prevent axial displacement of the collar toward the first axial end of the bearing body;

wherein the chamfer surface section of the collar is axially slidable along the chamfer surface sections of all of the mounting tab projections during assembly of the locking collar onto the bearing body such that displacement of the locking collar axially toward the second axial end of the bearing body deflects all of the mounting tabs radially inwardly so that the cylindrical inner surface of the retainer shoulder is slidable axially along the radially-outermost sections of the mounting tabs until the retainer shoulder is disposed within the annular groove.

2. The inner ring assembly as recited in claim 1, wherein the central bore of the locking collar has a main inner surface section extending axially from the outer axial end of the locking collar to the retainer shoulder, the main inner surface section being sized to frictionally engage with the outer surface sections of the projections of the plurality of mounting tabs.

3. The inner ring assembly as recited in claim 1, wherein the outer surface section of the projection of each mounting tab has an outside diameter with a value and the retainer shoulder has an inner circumferential surface section with an inside diameter with a value, the value of the inside diameter being less than the value of the outside diameter.

4. The inner ring assembly as recited in claim 1, wherein the locking collar has a centerline, the retainer shoulder is integrally formed with a remainder of the collar and one of:

the retainer shoulder is annular and extends entirely around the collar centerline; and the retainer shoulder is arcuate and extends partially about the centerline.

5. The inner ring assembly as recited in claim 1, wherein the central bore of the locking collar has an inside diameter and the locking collar further has a gap defining first and second spaced apart circumferential ends, a threaded opening formed in the first circumferential end, a through hole formed in the second circumferential end and a threaded rod extending through the through-hole and into the threaded opening such that rotation of the rod in a first angular direction displaces the body first and second ends generally toward each other to reduce the inside diameter of the central bore and compress the plurality of mounting tabs into engagement with the shaft.

6. The inner ring assembly as recited in claim 5, wherein the locking collar has an outer circumferential surface with a flat surface section, the flat surface section having a center spaced one hundred eighty degrees from the gap so as to increase the dynamic balance the locking collar about the shaft central axis and increase the flexibility of the locking collar during compression of the plurality of mounting tabs.

7. The inner ring assembly as recited in claim 5, wherein the threaded opening in the first circumferential end of the locking collar is oriented such that torque applied to rotate the threaded rod in the first angular direction biases the locking collar axially toward the second axial end of the bearing body.

8. The inner ring assembly as recited in claim 1, wherein each one of the plurality of mounting tabs has a recessed outer surface section extending axially from the inner end of the mounting tab to the projection of the mounting tab, the recessed surface section partially defining the recess of the mounting tab and being spaced radially inwardly from a main outer surface section of the remainder of the body such that a stop surface extends radially from the main outer surface section to the recessed outer surface section, a portion of the inner axial end of the locking collar being disposable against the stop surface.

* * * * *